US012687637B2

(12) United States Patent　　　　(10) Patent No.:　US 12,687,637 B2
Zhou et al.　　　　　　　　　　　　(45) Date of Patent:　Jul. 21, 2026

(54) FUSION POSITIONING METHOD AND APPARATUS, DEVICE AND COMPUTER-READABLE STORAGE MEDIUM

(71) Applicant: SHENZHEN PUDU TECHNOLOGY CO., LTD., Shenzhen (CN)

(72) Inventors: Yang Zhou, Shenzhen (CN); Tao Zhang, Shenzhen (CN); Meiwen Chen, Shenzhen (CN); Yunhang Liu, Shenzhen (CN); Kejun He, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 548 days.

(21) Appl. No.: 18/248,780

(22) PCT Filed: Dec. 2, 2021

(86) PCT No.: PCT/CN2021/135015
　　§ 371 (c)(1),
　　(2) Date: Apr. 12, 2023

(87) PCT Pub. No.: WO2022/142992
　　PCT Pub. Date: Jul. 7, 2022

(65) Prior Publication Data
　　US 2023/0400585 A1　　Dec. 14, 2023

(30) Foreign Application Priority Data
　　Dec. 29, 2020　(CN) ......................... 202011586133.3

(51) Int. Cl.
　　*G01S 17/89*　　(2020.01)
　　*G01C 21/20*　　(2006.01)
　　*G01S 7/48*　　(2006.01)
　　*G06T 7/50*　　(2017.01)
　　*G06T 7/70*　　(2017.01)

(52) U.S. Cl.
　　CPC .............. *G01S 17/89* (2013.01); *G01C 21/20* (2013.01); *G01S 7/4808* (2013.01); *G06T 7/50* (2017.01);
　　　　　　　　　　　　　　　　　　　　　(Continued)

(58) Field of Classification Search
　　CPC ...... G01S 17/89; G01S 7/4808; G01S 7/4802; G01S 17/931; G01S 17/42; G01S 17/88;
　　　　　　　　　　　　　　　　　　　　　(Continued)

(56) References Cited

U.S. PATENT DOCUMENTS 10,539,664 B2 *　1/2020　Baik ..................... G01S 7/4972
10,746,871 B2 *　8/2020　Kim ........................ G06F 3/011
　　　　　　　　　(Continued)

FOREIGN PATENT DOCUMENTS

CN　　　106908775 A　　6/2017
CN　　　108917759 A　　11/2018
　　　　　　　　　(Continued)

OTHER PUBLICATIONS

English translation of Zhang (Year: 2025).*
　　　　　　　　　(Continued)

*Primary Examiner* — Scott A Browne
*Assistant Examiner* — Shahira Baajour
(74) *Attorney, Agent, or Firm* — OPENPTO US LLC

(57)　　　　　　ABSTRACT

A fusion positioning method, comprising: sampling an environmental object by means of a two-dimensional laser radar carried by a robot, so as to acquire radar point cloud-related data of the environmental object; performing adjacent matching on the position $P_i$ of a landmark $L_i$ in the environmental object on a road sign map and the landmark map, so as to acquire the position $P_j$ of a landmark $L_j$ nearest to the position $P_i$ on the landmark map; performing scan matching on a two-dimensional grid map by using point cloud data, from which distortion is removed, of the environmental (Continued)

Sample, by a two-dimensional laser radar mounted on a robot, an environmental object to acquire radar point cloud related data of the environmental object, the radar point cloud related data including a position $P_i$ of a landmark $L_i$ in the environmental object on a landmark map and de-distortion point cloud data of the environmental object　S101

Match the position $P_i$ of the landmark $L_i$ on the landmark map with its neighbors on the landmark map to acquire a position $P_j$ of a landmark $L_j$ nearest to the position $P_i$ on the landmark map　S102

Perform scan matching on a two-dimensional grid map by using the de-distortion point cloud data of the environmental object to acquire a global pose of the robot in the two-dimensional grid map as a global pose observation value $G_{pose}$ of the robot　S103

Perform, based on the position $P_i$ of the landmark $L_i$ on the landmark map, the position $P_j$ of the landmark $L_j$ on the landmark map, an estimated pose of the robot and the global pose observation value $G_{pose}$, iterative optimization on a pose of the robot until an error $E_1$ which is a difference between the positions of the landmark $L_i$ and the landmark $L_j$ on the landmark map and an error $E_2$ which is a difference between the estimated pose of the robot and the global pose observation value $G_{pose}$ are minimized　S104 object, so as to acquire a global pose of the robot in the two-dimensional grid map, and taking same as a global pose observation value G pose of the robot; and according the position $P_i$ of the landmark $L_i$ on the landmark map, the position $P_j$ of the landmark $L_j$ on the landmark map, and an estimated pose and the global pose observation value G pose of the robot, performing an iterative optimization on the pose of the robot until the error $E_1$ and the error $E_2$ are the smallest.

16 Claims, 2 Drawing Sheets

(52) U.S. Cl.
CPC ...... *G06T 7/70* (2017.01); *G06T 2207/10028* (2013.01)

(58) Field of Classification Search
CPC .. G01C 21/20; G06T 7/50; G06T 7/70; G06T 2207/10028; G05D 1/0236; G05D 1/0274
See application file for complete search history.

(56) References Cited

U.S. PATENT DOCUMENTS

| | | | |
|---|---|---|---|
| 2002/0016649 A1* | 2/2002 | Jones | G05D 1/0238 700/245 |
| 2018/0299273 A1 | 10/2018 | Cai et al. | |
| 2018/0306587 A1 | 10/2018 | Holz | |
| 2019/0114798 A1 | 4/2019 | Afrouzi et al. | |
| 2020/0301015 A1 | 9/2020 | Siddiqui et al. | |
| 2022/0118555 A1* | 4/2022 | Sibley | B05B 15/68 |

FOREIGN PATENT DOCUMENTS

| | | |
|---|---|---|
| CN | 109270544 A | 1/2019 |
| CN | 110221603 A | 9/2019 |
| CN | 110487286 A | 11/2019 |
| CN | 110927740 A | 3/2020 |
| CN | 111045017 A | 4/2020 |
| CN | 111060092 A | 4/2020 |
| CN | 111708047 A | 9/2020 |
| CN | 111781609 A | 10/2020 |
| CN | 111812669 A | 10/2020 |
| CN | 112764053 A | 5/2021 |
| JP | 2020077162 A | 5/2020 |

OTHER PUBLICATIONS

Chinese Search Report for corresponding Application No. 2020115861333, dated Apr. 13, 2022, 3 pages.
Japanese Office Action for corresponding Application No. 2023-521741, dated Jul. 2, 2024, 3 pages.
Extended European Search Report for corresponding Application No. 21913733.8, dated Sep. 11, 2024, 74 pages.

* cited by examiner

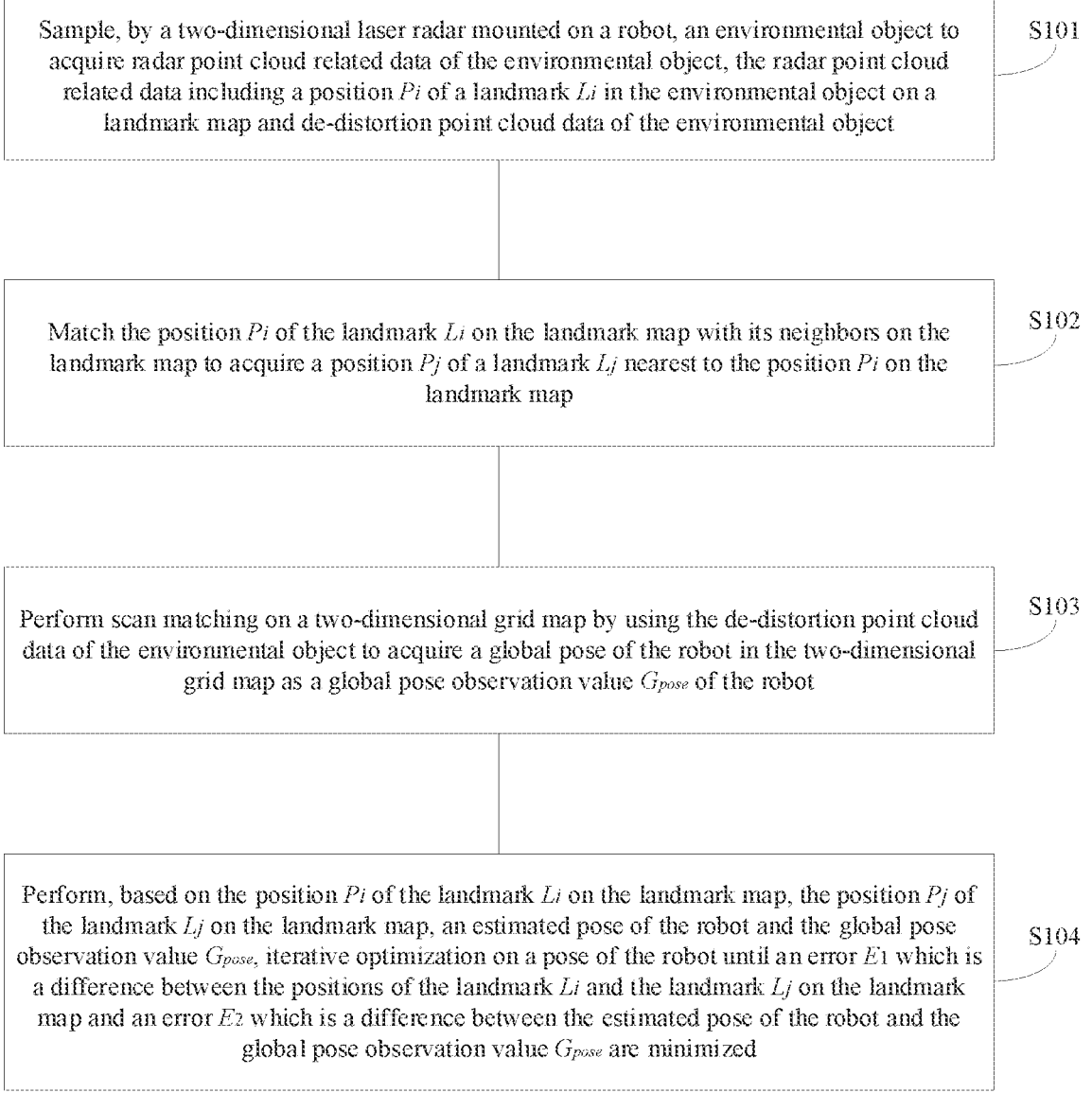

Sample, by a two-dimensional laser radar mounted on a robot, an environmental object to acquire radar point cloud related data of the environmental object, the radar point cloud related data including a position $Pi$ of a landmark $Li$ in the environmental object on a landmark map and de-distortion point cloud data of the environmental object          S101

Match the position $Pi$ of the landmark $Li$ on the landmark map with its neighbors on the landmark map to acquire a position $Pj$ of a landmark $Lj$ nearest to the position $Pi$ on the landmark map          S102

Perform scan matching on a two-dimensional grid map by using the de-distortion point cloud data of the environmental object to acquire a global pose of the robot in the two-dimensional grid map as a global pose observation value $G_{pose}$ of the robot          S103

Perform, based on the position $Pi$ of the landmark $Li$ on the landmark map, the position $Pj$ of the landmark $Lj$ on the landmark map, an estimated pose of the robot and the global pose observation value $G_{pose}$, iterative optimization on a pose of the robot until an error $E1$ which is a difference between the positions of the landmark $Li$ and the landmark $Lj$ on the landmark map and an error $E2$ which is a difference between the estimated pose of the robot and the global pose observation value $G_{pose}$ are minimized          S104

FIG. 1

FUSION POSITIONING METHOD AND APPARATUS, DEVICE AND COMPUTER-READABLE STORAGE MEDIUM

CROSS-REFERENCE TO RELATED APPLICATIONS

The present application is a US national phase of International patent application No. PCT/CN2021/135015, filed on Dec. 2, 2021, which, in turn, claims priority to Chinese patent application No. 2020115861333, entitled "Fusion Positioning Method and Device, Apparatus and Computer-Readable Storage Medium" and filed with China National Intellectual Property Administration on Dec. 29, 2020, the entire contents of both of which are incorporated herein by reference.

TECHNICAL FIELD

The present application relates to the field of robotics, and in particular, to a fusion positioning method and device, apparatus and computer-readable storage medium.

BACKGROUND

Mobile robots are used in various applications, and precise positioning is the key for robots to be able to complete their tasks successfully. In general, robot positioning is based on a three-dimensional or a two-dimensional laser radar. The two-dimensional laser radar positioning method is mainly to match laser radar point cloud data with a pre-built two-dimensional grid map to achieve estimation of a robot pose. However, this positioning method also encounters some problems, because there are some situations in the actual application scene where a certain degree of freedom, such as a long corridor and an open space, exceeds the observation range of the two-dimensional laser radar. In this case, the two-dimensional laser radar cannot fully constrain the three degrees of freedom of the robot pose in a two-dimensional space, which leads to an error of the robot pose estimation.

For the above-mentioned problems encountered in the robot positioning in the long corridor and the open space, a solution is to use manually made highly reflective landmarks for auxiliary positioning, for example, using reflective panels or reflective pillars for auxiliary positioning. However, using only the highly reflective landmark such as the reflective pillar or the reflective panel for auxiliary positioning is still unable to adapt to the environment with high requirements for environmental modification.

SUMMARY

According to various embodiments of the present application, a fusion positioning method and device, apparatus and computer-readable storage medium are provided.

A fusion positioning method is provided, including:

sampling, by a two-dimensional laser radar mounted on a robot, an environmental object to acquire radar point cloud related data of the environmental object, the radar point cloud related data including a position Pi of a landmark Li in the environmental object on a landmark map and de-distortion point cloud data of the environmental object;

matching the position Pi of the landmark Li on the landmark map with its neighbors on the landmark map to acquire a position Pj of a landmark Lj nearest to the position Pi on the landmark map;

performing scan matching on a two-dimensional grid map by using the de-distortion point cloud data of the environmental object to acquire a global pose of the robot in the two-dimensional grid map as a global pose observation value $G_{pose}$ of the robot; and performing, based on the position Pi of the landmark Li on the landmark map, the position Pj of the landmark Lj on the landmark map, an estimated pose of the robot and the global pose observation value $G_{pose}$, iterative optimization on a pose of the robot until an error $E_1$ which is a difference between the positions of the landmark Li and the landmark Lj on the landmark map and an error $E_2$ which is a difference between the estimated pose of the robot and the global pose observation value $G_{pose}$ are minimized.

The fusion positioning device is also provided, including:

a first acquisition module configured to sample an environmental object by a two-dimensional laser radar mounted on a robot to acquire radar point cloud related data of the environmental object, the radar point cloud related data including a position Pi of a landmark Li in the environmental object on a landmark map and de-distortion point cloud data of the environmental object;

a second acquisition module configured to match the position Pi of the landmark Li on the landmark map with its neighbors on the landmark map to acquire a position Pj of a landmark Lj nearest to the position Pi on the landmark map;

a third acquisition module configured to perform scan matching on a two-dimensional grid map by using the de-distortion point cloud data of the environmental object to acquire a global pose of the robot in the two-dimensional grid map as a global pose observation value $G_{pose}$ of the robot; and an iterative optimization module configured to perform iterative optimization on a pose of the robot based on the position Pi of the landmark Li on the landmark map, the position Pj of the landmark Lj on the landmark map, an estimated pose of the robot and the global pose observation value $G_{pose}$, until an error $E_1$ which is a difference between the positions of the landmark Li and the landmark Lj on the landmark map and an error $E_2$ which is a difference between the estimated pose of the robot and the global pose observation value $G_{pose}$ are minimized.

An apparatus is further provided, includes a memory, a processor, and a computer program stored on the memory and runnable on the processor. The computer program when executed by the processor causes the processor to implement the steps of the technical solution of the fusion positioning method as described above.

A computer-readable storage medium is further provided. The computer-readable storage medium stores a computer program. The computer program when executed by a processor causes the processor to implement the steps of the technical solution of the fusion positioning method as described above.

Details of one or more embodiments of the present application are presented in the accompanying drawings and description below. Other features and advantages of the present application will become apparent from the description, the accompanying drawings, and the claims.

BRIEF DESCRIPTION OF THE DRAWINGS

In order to more clearly illustrate the technical solutions in the embodiments of the present application or in the conventional art, the following briefly introduces the accompanying drawings that are used in the description of the embodiments or the conventional art. Apparently, the accompanying drawings in the following description are only some of the embodiments of the present application, for those of ordinary skill in the art, other drawings can also be obtained according to these accompanying drawings without any creative effort.

FIG. 1 is a flowchart of a fusion positioning method provided by an embodiment of the present application.

DETAILED DESCRIPTION OF THE EMBODIMENTS

Figure 2:
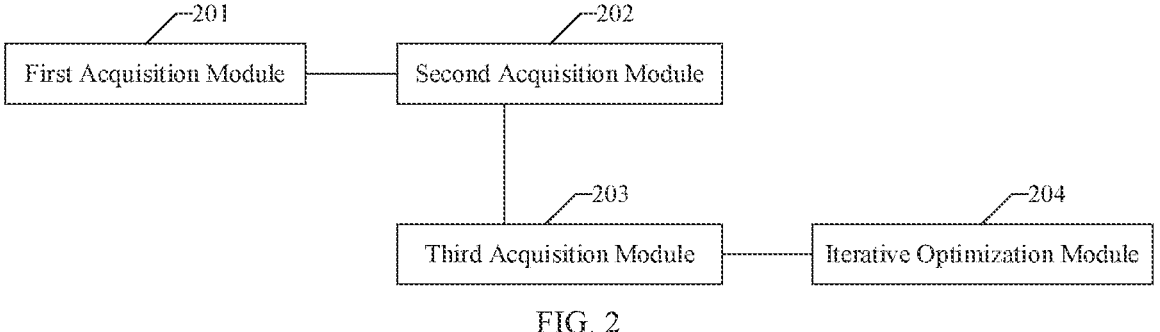
FIG. 2 is a schematic diagram illustrating a configuration of a fusion positioning device provided by an embodiment of the present application.

In order to facilitate understanding of the present application, the present application will be described more fully below with reference to the relevant accompanying drawings. Preferred embodiments of the present application are presented in the accompanying drawings. However, the present application may be implemented in many different forms and is not limited to the embodiments described herein. Rather, these embodiments are provided for the purpose of making a more thorough and comprehensive understanding of the disclosure of the present application.

Unless otherwise defined, all technical and scientific terms used herein have the same meaning as commonly understood by those skilled in the technical field to which the present application belongs. The terms used herein in the specification of the application are for the purpose of describing specific embodiments only, and are not intended to limit the present application. The term "and/or" as used herein includes any and all combinations of one or more of the relevant listed items.

The present application proposes a fusion positioning method, which can be applied to a robot. The robot may be a robot operating in a restaurant, for example, a food delivery robot, or a robot operating in a medical place, for example, a drug delivery robot operating in a hospital, or a handling robot operating in a warehouse or other place, etc. As shown in FIG. 1, the fusion positioning method mainly includes steps S101 to S104, as detailed below.

Step S101: sample, by a two-dimensional laser radar mounted on a robot, an environmental object to acquire radar point cloud related data of the environmental object, the radar point cloud related data including a position Pi of a landmark Li in the environmental object on a landmark map and de-distortion point cloud data of the environmental object.

In the embodiment of the present application, environment refers to the working environment of the robot, and the environmental object refers to all objects in the working environment of the robot, including landmarks arranged in the environment and other objects, such as certain goods, a tree, a wall or a table, etc. While the landmark may be a reflective pillar, a reflective strip and other rod-shaped object arranged in the working environment of the robot and within the visual range of the two-dimensional laser radar. The diameter of the reflective pillar may be about 5 cm, and the width of the reflective strip may also be about 5 cm. In order to play a more accurate role in auxiliary positioning, it is required to arrange at least three or more reflective pillars, reflective strips and other landmarks, and it is desired that these reflective pillars, reflective strips and other landmarks should not be arranged in the same straight line, and the spacing should be more than 1 meter.

As an embodiment of the present application, the sampling, by the two-dimensional laser radar mounted on the robot, the environmental object to acquire the radar point cloud related data of the environmental object may be achieved by steps S1011 to S1014, as described below.

Step S1011: samples, by the two-dimensional laser radar, the environmental object to acquire raw radar point cloud data of the environmental object.

In the embodiment of the present application, the sampling process of the two-dimensional laser radar mounted on the robot is the same as the conventional art, which is to scan the current environment in real time by firing laser beams into the surrounding environment, and calculate the distance between the robot and the landmarks in the environment using the time-of-flight ranging method. When each laser beam hits the environmental object, information such as the angle of that laser beam relative to the robot and the distance between the laser source and the struck environmental object, etc., and the above information when multiple laser beams hit the environmental object constitutes the raw radar point cloud data of the environmental object. The landmark Li sampled by the two-dimensional laser radar is any landmark in the environment.

Step S1012: remove, based on a relative pose of each point in the raw radar point cloud data, distortion from the raw radar point cloud data of the environmental object to acquire the de-distortion point cloud data of the environmental object.

Since the robot is moving while the two-dimensional laser radar is sampling the environment, the origin of the coordinates of each sampled point in a laser radar coordinate system is not the same. For example, when the two-dimensional laser radar samples the second point, as the robot produces a displacement at this time, a origin of the laser radar coordinate system where the two-dimensional laser radar is located also produces a displacement, similarly, from the second point to the last point at the end of one scan cycle, the origin of the laser radar coordinate system is different for each sampled point, which makes the radar point cloud data distortion, and this distortion should be eliminated. Specifically, removing, based on the relative pose of each point in the raw radar point cloud data, distortion from the raw radar point cloud data of the environmental object to acquire the de-distortion point cloud data of the environmental object may include: determining a new origin of a laser radar coordinate system in which the two-dimensional laser radar is located after one scan cycle; and multiplying a relative pose $\Delta T$ with a coordinate P of each point in the raw radar point cloud data in the laser radar coordinate system of an old origin, and taking a result of the multiplication $\Delta T*P$ as a coordinate of each point in the raw radar point cloud data relative to the new origin. The relative pose $\Delta T$ is robot pose data obtained for each point in the raw radar point cloud data with respect to the new origin. The above determinating the new origin of the laser radar coordinate system in which the two-dimensional laser radar is located after one scan cycle refers to determining a center point of the two-dimensional laser radar as the new origin of the laser radar coordinate system in which the two-dimensional laser radar is located when the last point in a frame of the laser radar point cloud data is sampled by the two-dimensional laser radar at the end of one scan cycle of the two-dimensional laser radar.

Step S1013: cluster the de-distortion point cloud data of the landmark Li in the environmental object to acquire a point cloud cluster of the landmark Li.

As mentioned before, the environmental object includes landmarks such as the reflective pillar and the reflective strip arranged in the environment, so the de-distortion point cloud data of the environmental object obtained by step S1012 also includes the de-distortion point cloud data of the landmark Li in the environmental object. As for how to extract the de-distortion point cloud data of the landmark Li in the environmental object, one method is to obtain the de-distortion point cloud data of the environmental object by removing distortion from the raw radar point cloud data of the environmental object, and then compare a laser reflective intensity corresponding to a respective point in the de-distortion point cloud data of the environmental object with a preset light intensity threshold, remove the points having the laser reflective intensity less than the preset light intensity threshold, and select point cloud data having the laser reflective intensity higher than the preset light intensity threshold (that is, the laser reflective intensity is greater than or equal to the preset light intensity threshold) in the de-distorted point cloud data of the environmental object. The point cloud data having the laser reflective intensity higher than the preset light intensity threshold will be used as the de-distortion point cloud data of the landmark Li in the environmental object. For example, if the laser reflective intensity that can be detected by the two-dimensional laser radar is assumed to be 0 to 1, and since the laser reflective intensity of the landmarks such as the reflective pillar and the reflective strip is generally above 0.85, the preset light intensity threshold may be set to 0.85, and then the point cloud data having the laser reflective intensity higher than 0.85 in the de-distortion point cloud data of the environmental object are retained, and these point cloud data with laser reflective intensity higher than 0.85 are the de-distortion point cloud data of the landmark Li in the environmental object.

Considering that the Density-Based Spatial Clustering of Applications with Noise (DBSCAN) algorithm has the advantages of being able to cluster dense data sets of any shape and discovering anomalies while clustering, and the clustering results rarely occurring bias, etc., in the embodiment of the present application, the DBSCAN algorithm may be used to cluster the de-distortion point cloud data of the landmark Li in the environmental object to acquire the point cloud cluster of the landmark Li.

Step S1014: derive a geometric center coordinate of the point cloud cluster of the landmark Li in a robot body coordinate system, and take the geometric center coordinate of the point cloud cluster of the landmark Li in the robot body coordinate system as the position Pi of the landmark Li on the landmark map.

After clustering and acquiring the point cloud cluster of the landmark Li, the point cloud cluster of the landmark Li may be considered as a mass point, and a geometric or physical method may be used to derive the geometric center coordinate of the point cloud cluster of the landmark Li in the robot body coordinate system. The geometric center coordinate of the point cloud cluster of the landmark Li in the robot body coordinate system are used as the position Pi of the landmark Li on the landmark map. Since the diameter of the reflective pillar and the width of the reflective strip are relatively small in the embodiment of the present application, the geometric center of the landmarks such as the reflective pillar and the reflective strip basically can be approximately reflected by simply deriving the point cloud cluster geometric center of the landmark Li.

Step S102: matching the position Pi of the landmark Li on the landmark map with its neighbors on the landmark map to acquire a position Pj of a landmark Lj nearest to the position Pi on the landmark map.

In the embodiment of the present application, the landmark map is a pre-made map reflecting the location of the landmark in the world coordinate system, and a point in the landmark map is considered as one landmark. As mentioned before, the position Pi of the landmark Li on the landmark map is the geometric center coordinate of the point cloud cluster of the landmark Li in the robot body coordinate system. Specifically, a nearest neighbor algorithm, such as the kNN (k-Nearest Neighbor) algorithm may be used to match the position Pi of the landmark Li on the landmark map with its neighbors on the landmark map, and acquire the position Pj of the landmark Li nearest to the position Pi on the landmark map.

Step S103: perform scan matching on a two-dimensional grid map by using the de-distortion point cloud data of the environmental object to acquire a global pose of the robot in the two-dimensional grid map as a global pose observation value $G_{pose}$ of the robot.

In the embodiment of the present application, the two-dimensional grid map is also called a two-dimensional grid probability map or a two-dimensional occupancy grid map, in which a plane is divided into individual grids, and each grid is assigned with an occupancy rate. The occupancy rate refers to the probability of a state (occupied state) in which a grid is occupied by an obstacle, the probability of a state (free state) in which the grid is occupied by no obstacle, or the probability of a state in which it is between these two states, on the two-dimensional occupancy grid map. The state in which the grid is occupied by the obstacle is represented by 1, the state in which the grid is occupied by no obstacles is represented by 0, and a state between the two states is represented by a value between 0 and 1. Obviously, the occupancy rate indicates the possibility of a grid is occupied by an obstacle. The greater the occupancy rate of the grid is, the greater the grid is occupied by the obstacle, and vice versa.

As an embodiment of the present application, the performing scan matching on the two-dimensional grid map by using the de-distortion point cloud data of the environmental object to acquire the global pose of the robot in the two-dimensional grid map as the global pose observation value $G_{pose}$ of the robot may be achieved by steps S1031 to S1033, as described below.

Step S1031: determine several candidate poses in a pose search space from the pose of the robot at a previous time of a current time.

The pose of the robot refers to the state of the robot in the world coordinate system, which is expressed using position and posture. Specifically, the pose of the robot at a given moment is expressed in terms of its horizontal coordinate r, vertical coordinate y, and angle $\theta$ relative to the horizontal axis in the world coordinate system, i.e., $(x, y, \theta)$. Assuming that the pose of the robot at the previous time of the current time is estimated to $(x, y, \theta)$, an increment $\Delta x$, $\Delta y$ and $\Delta \theta$ is given to each of its components respectively on this pose of the robot, and there are several candidate poses $(x_1, y_1, \theta_1)$, $(x_2, y_2, \theta_2), \ldots, (x_i, y_i, \theta_i), \ldots, (x_n, y_n, \theta_n)$ in the pose search space $(\Delta x, \Delta y, \Delta \theta)$.

Step S1032: project, by using each candidate pose of the several candidate poses, the de-distortion point cloud data of the environmental object onto the two-dimensional grid map, and calculate a matching score of the each candidate pose on the two-dimensional grid map.

In this case, the projection of the de-distortion point cloud data of the environmental object onto the two-dimensional grid map means that the de-distortion point cloud data of the environmental object is transformed to a certain occupied position or grid on the two-dimensional grid map according to some transformation relationship. When the candidate poses are different, the de-distortion point cloud data of the environmental object may be transformed to different grids on the two-dimensional grid map. Suppose a candidate pose $(x_i, y_i, \theta_i)$, the de-distortion point cloud data of the environmental object is $(x_j, y_j, \theta_j)$, corresponding to the candidate pose $(x_i, y_i, \theta_i)$, and the grid position of this $(x_j, y_j, \theta_j)$ projected onto the two-dimensional grid map is denoted by $$(x_{zk}^j, y_{zk}^j),$$

then:

$$\begin{bmatrix} x_{zk}^j \\ y_{zk}^j \end{bmatrix} = \begin{bmatrix} x_i \\ y_i \end{bmatrix} + \begin{bmatrix} \cos\theta_i & -\sin\theta_i \\ \sin\theta_i & \cos\theta_i \end{bmatrix}\begin{bmatrix} x_j \\ y_j \end{bmatrix} = zk\begin{bmatrix} \cos(\theta_i + \theta_j) \\ \sin(\theta_i + \theta_j) \end{bmatrix},$$

where zk is the number of the grid at position $$(x_{zk}^j, y_{zk}^j)$$

on the two-dimensional grid map.

And as mentioned before, different grids are assigned with different occupancy rates. For the candidate pose $(x_i, y_i, \theta_i)$, its matching score on the two-dimensional grid map is the sum of the occupancy rates of each of the de-distortion point cloud data of the environmental object when projected onto different grids on the two-dimensional grid map. That is, any one of the de-distortion point cloud data $(x_i, y_i, \theta_i)$ of the environmental object is projected onto the grid at position $$(x_{zk}^j, y_{zk}^j)$$

on the two-dimensional grid map, and its corresponding occupancy rate is Oj. Corresponding to the candidate pose $(x_i, y_i, \theta_i)$, the matching score of the de-distortion point cloud data of the environmental object on the two-dimensional grid map when projected onto the two-dimensional grid map is $$\text{Score}_i = \sum_{j=1}^{m} O_j,$$

where m is the number of the de-distortion point cloud data of the environmental object.

Step S1033: determine a candidate pose having the highest matching score on the two-dimensional grid map among the several candidate poses as the global pose of the robot in the two-dimensional grid map.

From the analysis in step S1032, it is known that for the above in candidate poses, in different matching scores Score_i may be acquired, and the candidate pose having the highest matching score on the two-dimensional grid map among the n candidate poses may be determined as the global pose of the robot in the two-dimensional grid map. That is, $\text{Score}_k=\max\{\text{Score}_i\}$ is chosen and the candidate pose $(x_k, y_k, \theta_k)$ corresponding to $\text{Score}_k$ is determined as the global pose of the robot in the two-dimensional grid map, which is used as the global pose observation value $G_{pose}$ of the robot.

Step S104: perform, based on the position Pi of the landmark Li on the landmark map, the position Pj of the landmark Lj on the landmark map, an estimated pose of the robot and the global pose observation value $G_{pose}$, iterative optimization on a pose of the robot until an error $E_1$ which is a difference between the positions of the landmark Li and the landmark Lj on the landmark map and an error $E_2$ which is a difference between the estimated pose of the robot and the global pose observation value $G_{pose}$ are minimized. The estimated pose is a pose of the robot estimated by for example, a speed transducer or speed encoder in the robot. Both the speed transducer and the speed encoder are commercially available and known in the art.

As an embodiment of the present application, the performing iterative optimization, based on the position Pi of the landmark Li on the landmark map, the position Pj of the landmark Lj on the landmark map, the estimated pose of the robot and the global pose observation value $G_{pose}$, on the pose of the robot until the error $E_1$ and the error $E_2$ are minimized may include: constructing a nonlinear least square problem using the pose of the robot as a state; and taking the error $E_1$ as an error constraint condition of the nonlinear least square problem, and iteratively optimizing the pose of the robot until the error $E_1$ and the error $E_2$ are minimized. The error $E_1$ is the difference between the position of the landmark Li and the landmark Li on the landmark map, and the error $E_2$ is the difference between the estimated pose of the robot and the global pose observation value $G_{pose}$.

As another embodiment of the present application, the performing iterative optimization, based on the position Pi of the landmark Li on the landmark map, the position Pj of the landmark Lj on the landmark map, the estimated pose of the robot and the global pose observation value $G_{pose}$, on the pose of the robot until the error $E_1$ and the error $E_2$ are minimized may also include: constructing a particle filter model or an extended Kalman filter model based on the position Pi of the landmark Li on the landmark map, the position Pj of the landmark Lj on the landmark map, the estimated pose of the robot and the global pose observation value $G_{pose}$; and continuously correcting the estimated pose of the robot using the particle filter model or the extended Kalman filter model until the error $E_1$ and the error $E_2$ are minimized. The meaning of the error $E_1$ and the error $E_2$ here is the same as the meaning of the error $E_1$ and the error $E_2$ mentioned in the above embodiment. In the embodiment of the present application, the extended Kalman filter (EKF) is an extension of the standard Kalman filter in the nonlinear case, which is an efficient recursive filter, i.e., an autoregressive filter. Its basic idea is to linearize the nonlinear system using Taylor series expansion and then filter the data using the Kalman filter framework. The particle filter is a process of finding a set of random samples propagating in the state space to approximately represent the probability density function, and using the sample mean instead of the integration operation to obtain the minimum variance estimate of the system state. These samples are imaginatively called "particles".

The above-mentioned constructing the particle filter model or the extended Kalman filter model based on the position Pi of the landmark Li on the landmark map, the position Pj of the landmark Lj on the landmark map, the estimated pose of the robot and the global pose observation value $G_{pose}$, and continuously correcting the estimated pose of the robot using the particle filter model or the extended Kalman filter model until the error $E_1$ and the error $E_2$ are minimized may include: obtaining a current particle swarm based on the estimated pose of the robot and the amount of pose change in a predetermined time period, the each particle in the particle swarm representing a pose of the robot, and the particle swarm being used to represent the probability distribution of the poses of the robot; assigning a weight to each particle in the current particle swarm, and obtaining a first estimated pose of the robot based on the assigned weight, where the weight is used to characterize the probability of each particle being a current actual pose, performing scan matching using a preset scan matching model based on the first estimated pose, the position Pi of the landmark Li on the landmark map, the position Pj of the landmark Lj on the landmark map and the global pose observation value $G_{pose}$, to obtain a second estimated pose; and continuously correcting the second estimated pose, and using the estimated pose obtained until the error $E_1$ and the error $E_2$ are minimized as a final pose of the robot.

As can be seen from the above fusion positioning method illustrated in FIG. 1, on the one hand, the technical solution of the present application samples the environmental object, matches the nearest landmark Lj with the position Pi of the landmark Li in the environmental object, and obtains the position difference $E_1$ between the landmark Li and the landmark Lj on the landmark map. On the other hand, the technical solution of the present application performs scan matching on the two-dimensional grid map by using the de-distortion point cloud data of the environmental object, obtains the difference $E_2$ between the estimated pose of the robot and the global pose observation value Gpose of the robot, and finally iteratively optimizes the pose of the robot until the error $E_1$ and error $E_2$ are minimized. Compared with the conventional art, which only uses landmark to assist in positioning, the technical solution of the present application combines a landmark positioning and a two-dimensional grid map positioning, thus making the positioning of the robot more accurate.

Referring to FIG. 2, a fusion positioning device is provided by an embodiment of the present application. The fusion positioning device may include a first acquisition module 201, a second acquisition module 202, a third acquisition module 203, and an iterative optimization module 204, as detailed below.

The first acquisition module 201 is configured to sample an environmental object by a two-dimensional laser radar mounted on a robot to acquire radar point cloud related data of the environmental object. The radar point cloud related data includes a position Pi of a landmark Li in the environmental object on a landmark map and de-distortion point cloud data of the environmental object.

The second acquisition module 202 is configured to match he position Pi of the landmark Li in the environmental object with its neighbors on the landmark map to acquire a position Pj of a landmark Lj nearest to the position Pi on the landmark map.

The third acquisition module 203 is configured to perform scan matching on a two-dimensional grid map by using de-distortion point cloud data of the environment object to acquire a global pose of the robot in the two-dimensional grid map as a global pose observation value $G_{pose}$ of the robot.

The iterative optimization module 204 is configured to perform iterative optimization on a pose of the robot based on the position Pi of the landmark Li on the landmark map, the position Pj of the landmark Lj on the landmark map, an estimated pose of the robot and the global pose observation value $G_{pose}$ until an error $E_1$ which is a difference between the positions of the landmark Li and the landmark Li on the landmark map and an error $E_2$ which is a difference between the estimated pose of the robot and the global pose observation value $G_{pose}$ are minimized.

Optionally, the first acquisition module 201 illustrated in FIG. 2 may include a sampling unit, a correction unit, a clustering unit, and a center finding unit.

The sampling unit is configured to sample the environmental object by the two-dimensional laser radar to acquire raw radar point cloud data of the environmental object.

The correction unit is configured to remove distortion from the raw radar point cloud data of the environmental object based on a relative pose of each point in the raw radar point cloud data to acquire the de-distortion point cloud data of the environmental object.

The clustering unit is configured to cluster the de-distortion point cloud data of the landmark Li in the environmental object to acquire a point cloud cluster of the landmark $L_i$.

The center finding unit is configured to derive a geometric center coordinate of the point cloud cluster in a the robot body coordinate system, and take the geometric center coordinate of the point cloud cluster in the robot body coordinate system as the position $P_i$ of the landmark Li on the landmark map.

Optionally, the above correction unit may include a new origin determination unit and a multiplication unit.

The new origin determination unit is configured to determine a new origin of a laser radar coordinate system in which the two-dimensional laser radar is located after one scan cycle.

The multiplication unit is configured to multiply a relative pose $\Delta T$ with a coordinate P of each point in the raw radar point cloud data in the laser radar coordinate system of an old origin, and take a result of the multiplication $\Delta T*P$ as a coordinate of each point in the raw radar point cloud data relative to the new origin. The relative pose $\Delta T$ is robot pose data obtained for each point in the raw radar point cloud data with respect to the new origin.

Optionally, the device illustrated in FIG. 2 may also include a comparison module and a filtering module.

The comparison module is configured to compare a laser reflective intensity corresponding to a respective point in the de-distorted point cloud data of the environmental object with a preset light intensity threshold.

The filtering module is configured to select point cloud data having the laser reflectance intensity higher than the preset light intensity threshold in the de-distorted point cloud data of the environmental object, as a de-distorted point cloud data of the landmark Li in the environmental object.

Optionally, the third acquisition module 203 illustrated in FIG. 2 may include a search unit, a matching unit, and a global pose determination unit.

The search unit is configured to determine several candidate poses in a pose search space from the poses of the robot at a previous time of a current time.

The matching unit is configured to project the de-distortion point cloud data of the environmental object onto the two-dimensional grid map by using each candidate pose of the several candidate poses, and calculate a matching score of the each candidate pose on the two-dimensional grid map.

The global pose determination unit is configured to determine a candidate pose having the highest matching score on the two-dimensional grid map among the several candidate poses as the global pose of the robot in the two-dimensional grid map.

Optionally, the iterative optimization module 204 illustrated in FIG. 2 may include a construction unit and a first correction unit.

The construction unit is configured to construct a nonlinear least square problem using the pose of the robot as a state.

The first correction unit is configured to take the error $E_1$ as an error constraint condition of the nonlinear least square problem, and iteratively optimize the pose of the robot until the error $E_1$ and the error $E_2$ are minimized.

Optionally, the iterative optimization module 204 illustrated in FIG. 2 may include a model construction unit and a second correction unit.

The model construction unit is configured to construct a particle filter model or an extended Kalman filter model based on the position Pi of the landmark Li on the landmark map, the position Pj of the landmark Lj on the landmark map, the estimated pose of the robot and the global pose observation value $G_{pose}$.

The second correction unit is configured to continuously correct the estimated pose of the robot using the particle filter model or the extended Kalman filter model, until the error $E_1$ and the error $E_2$ are minimized.

From the description of the technical solution above, on the one hand, the technical solution of the present application samples the environmental object, matches the nearest landmark Lj with the position Pi of the landmark Li in the environmental object, and obtains the position difference $E_1$ between the landmark Li and the landmark Lj on the landmark map. On the other hand, the technical solution of the present application performs scan matching on the two-dimensional grid map by using the de-distortion point cloud data of the environmental object, obtains the difference $E_2$ between the estimated pose of the robot and the global pose observation value $G_{pose}$ of the robot, and finally iteratively optimizes the pose of the robot until the error $E_1$ and error $E_2$ are minimized. Compared with the conventional art, which only uses landmark to assist in positioning, the technical solution of the present application combines a landmark positioning and a two-dimensional grid map positioning, thus making the positioning of the robot more accurate.

Figure 3:
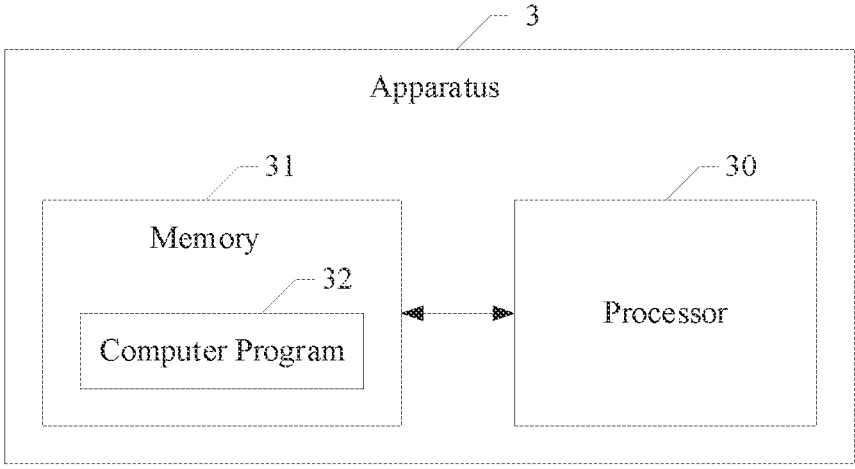
FIG. 3 is a schematic diagram illustrating a configuration of an apparatus provided by an embodiment of the present application.

Referring to FIG. 3, a schematic diagram illustrates a configuration of an apparatus provided by an embodiment of the present application. As shown in FIG. 3, the apparatus 3 according to this embodiment primarily includes a processor 30, a memory 31, and a computer program 32 stored on the memory 31 and runnable on the processor 30, such as a program for the fusion positioning method. The computer program 32 when executed by the processor 30 causes the processor 30 to implement the steps described in the above embodiments for the fusion positioning method, such as steps S101 to S104 shown in FIG. 1. Alternatively, the computer program 32 when executed by the processor 30 causes the processor 30 to implement the function of each module/unit described in the above embodiments for the device, such as the function of the first acquisition module

201, the second acquisition module 202, the third acquisition module 203, and the iterative optimization module 204 shown in FIG. 2.

Exemplarily, the computer program 32 for the fusion positioning method mainly includes: sampling, by a two-dimensional laser radar mounted on a robot, an environmental object to acquire radar point cloud related data of the environmental object, the radar point cloud related data including a position Pi of a landmark Li in the environmental object on a landmark map and de-distortion point cloud data of the environmental object; matching the position Pi of the landmark Li on the landmark map with its neighbors on the landmark map to acquire a position Pj of a landmark Lj nearest to the position Pi on the landmark map; performing scan matching on a two-dimensional grid map by using de-distortion point cloud data of the environmental object to acquire a global pose of the robot in the two-dimensional grid map as a global pose observation value $G_{pose}$ of the robot; and performing, based on the position Pi of the landmark Li on the landmark map, the position $P_j$ of the landmark Lj on the landmark map, an estimated pose of the robot and the global pose observation value $G_{pose}$, iterative optimization on a pose of the robot until an error $E_1$ which is a difference between the positions of the landmark Li and the landmark Lj on the landmark map and an error $E_2$ which is a difference between the estimated pose of the robot and the global pose observation value $G_{pose}$ are minimized. The computer program 32 may be partitioned into one or more modules/units. The one or more modules/units are stored on the memory 31 and executed by the processor 30 to implement the present application. The one or more modules/units may be a series of computer program instruction segments capable of performing a specific function, which are used to describe the execution of the computer program 32 in the device 3. For example, the computer program 32 may be partitioned into the functions of the first acquisition module 201, the second acquisition module 202, the third acquisition module 203, and the iterative optimization module 204 (the module in the virtual device). The specific functions of each module are as follows. The first acquisition module 201 is configured to sample an environmental object by a two-dimensional laser radar mounted on a robot to acquire radar point cloud related data of the environmental object. The radar point cloud related data includes a position Pi of a landmark Li in the environmental object on a landmark map and de-distortion point cloud data of the environmental object. The second acquisition module 202 is configured to match the position Pi of the landmark Li in the environmental object on the landmark map with its neighbors on the landmark map to acquire a position Pi of a landmark Lj nearest to the position Pi on the landmark map. The third acquisition module 203 is configured to perform scan matching on a two-dimensional grid map by using de-distortion point cloud data of the environment object to acquire a global pose of the robot in the two-dimensional grid map as a global pose observation value $G_{pose}$ of the robot. The iterative optimization module 204 is configured to perform iterative optimization on a pose of the robot based on the position Pi of the landmark Li on the landmark map, the position Pj of the landmark Lj on the landmark map, an estimated pose of the robot and the global pose observation value $G_{pose}$, until an error $E_1$ which is a difference between the positions of the landmark Li and the landmark Lj on the landmark map and an error $E_2$ which is a difference between the estimated pose of the robot and the global pose observation value $G_{pose}$ are minimized are minimized are minimized.

The apparatus 3 may include, but is not limited to the processor 30 and the memory 31. It will be understood by those skilled in the art that FIG. 3 is only an example of the apparatus 3 and does not constitute a limitation of the apparatus 3, which may include more or fewer components than shown, or a combination of certain components, or different components, e.g., a computing apparatus may also include input/output devices, a network access device, a bus, etc.

The processor 30 can be a central processing unit (CPU), but also other general purpose processor, a digital signal processor (DSP), an application specific integrated circuit (ASIC), a field-programmable gate array (FPGA) or other programmable logic device, a discrete gate or a transistor logic device, a discrete hardware component, etc. The general purpose processor may be a microprocessor or any conventional processor, etc.

The memory 31 may be an internal storage unit of the device 3, such as a hard disk or an internal memory of the device 3. The memory 31 can also be an external storage device of the device 3, such as a plug-in hard disk, a smart media card (SMC), a secure digital (SD) card, a flash card, etc. equipped on the device 3. Further, the memory 31 may also include both the internal storage unit of the device 3 and the external storage device. The memory 31 is used to store the computer program, as well as other program and data required by the device. The memory 31 can also be used to temporarily store data that has been output or will be output.

The technical features in the above embodiments can be combined arbitrarily. For concise description, not all possible combinations of the technical features in the above embodiments are described. However, all the combinations of the technical features are to be considered as falling within the scope described in this specification provided that they do not conflict with each other.

The above-mentioned embodiments only describe several implementations of the present application, and their description is specific and detailed, but should not be understood as a limitation on the patent scope of the invention. It should be pointed out that for those skilled in the art may further make variations and improvements without departing from the conception of the present application, and these all fall within the protection scope of the present application. Therefore, the protection scope of the present application should be subject to the appended claims.

What is claimed is:

1. A fusion positioning method applied to a robot, comprising:

sampling, by a two-dimensional laser radar mounted on the robot, an environmental object to acquire radar point cloud related data of the environmental object, the radar point cloud related data comprising a position Pi of a landmark Li in the environmental object on a landmark map and de-distortion point cloud data of the environmental object;

matching the position Pi of the landmark Li on the landmark map with its neighbors on the landmark map to acquire a position Pj of a landmark Lj nearest to the position Pi on the landmark map;

performing scan matching on a two-dimensional grid map by using the de-distortion point cloud data of the environmental object to acquire a global pose of the robot in the two-dimensional grid map as a global pose observation value Gpose of the robot; and performing, based on the position Pi of the landmark Li on the landmark map, the position Pj of the landmark Lj on the landmark map, an estimated pose of the robot and the global pose observation value Gpose, iterative optimization on a pose of the robot until an error E1 which is a difference between the positions of the landmark Li and the landmark Lj on the landmark map and an error E2 which is a difference between the estimated pose of the robot and the global pose observation value Gpose are minimized;

wherein sampling, by the two-dimensional laser radar mounted on the robot, the environmental object to acquire the radar point cloud related data of the environmental object comprises:

sampling, by the two-dimensional laser radar, the environmental object to acquire raw radar point cloud data of the environmental object;

removing, based on a relative pose of each point in the raw radar point cloud data, distortion from the raw radar point cloud data of the environmental object to acquire the de-distortion point cloud data of the environmental object;

clustering the de-distortion point cloud data of the landmark Li in the environmental object to acquire a point cloud cluster of the landmark Li; and deriving a geometric center coordinate of the point cloud cluster in a robot body coordinate system, and taking the geometric center coordinate of the point cloud cluster in the robot body coordinate system as the position Pi of the landmark Li on the landmark map; and wherein removing, based on the relative pose of each point in the raw radar point cloud data, distortion from the raw radar point cloud data of the environmental object to acquire the de-distortion point cloud data of the environmental object comprises:

determining a new origin of a laser radar coordinate system in which the two-dimensional laser radar is located after one scan cycle; and multiplying a relative pose $\Delta T$ with a coordinate P of each point in the raw radar point cloud data in the laser radar coordinate system of an old origin, and taking a result of the multiplication $\Delta T*P$ as a coordinate of each point in the raw radar point cloud data relative to the new origin, the relative pose $\Delta T$ being robot pose data obtained for each point in the raw radar point cloud data with respect to the new origin.

2. The fusion positioning method of claim 1, after the removing distortion from the raw radar point cloud data of the environmental object to acquire the de-distortion point cloud data of the environmental object, further comprising:

comparing a laser reflective intensity corresponding to a respective point in the de-distortion point cloud data of the environmental object with a preset light intensity threshold; and selecting point cloud data having the laser reflective intensity higher than the preset light intensity threshold in the de-distortion point cloud data of the environmental object, as the de-distortion point cloud data of the landmark Li in the environmental object.

3. The fusion positioning method of claim 1, wherein the performing scan matching on the two-dimensional grid map by using the de-distortion point cloud data of the environmental object to acquire the global pose of the robot in the two-dimensional grid map as the global pose observation value Gpose of the robot comprises:

determining several candidate poses in a pose search space from the pose of the robot at a previous time of a current time;

projecting, by using each candidate pose of the several candidate poses, the de-distortion point cloud data of the environmental object onto the two-dimensional grid map, and calculating a matching score of the each candidate pose on the two-dimensional grid map; and determining a candidate pose having the highest matching score on the two-dimensional grid map among the several candidate poses as the global pose of the robot in the two-dimensional grid map.

4. The fusion positioning method of claim 1, wherein the performing iterative optimization, based on the position Pi of the landmark Li on the landmark map, the position Pj of the landmark Lj on the landmark map, the estimated pose of the robot and the global pose observation value Gpose, on the pose of the robot until the error E1 and the error E2 are minimized comprises:

constructing a nonlinear least square problem using the pose of the robot as a state; and taking the error E1 as an error constraint condition of the nonlinear least square problem, and iteratively optimizing the pose of the robot until the error E1 and the error E2 are minimized.

5. The fusion positioning method of claim 1, wherein the performing iterative optimization, based on the position Pi of the landmark Li on the landmark map, the position Pj of the landmark Lj on the landmark map, the estimated pose of the robot and the global pose observation value Gpose, on the pose of the robot until the error E1 and the error E2 are minimized comprises:

constructing a particle filter model or an extended Kalman filter model based on the position Pi of the landmark Li on the landmark map, the position Pj of the landmark Lj on the landmark map, the estimated pose of the robot and the global pose observation value Gpose; and continuously correcting the estimated pose of the robot using the particle filter model or the extended Kalman filter model until the error E1 and the error E2 are minimized.

6. A fusion positioning device applied to a robot, comprising:

a processor;

a memory; and a computer program stored on the memory and configured to be executed by the processor, the computer program comprising:

a first acquisition module configured to sample an environmental object by a two-dimensional laser radar mounted on the robot to acquire radar point cloud related data of the environmental object, the radar point cloud related data comprising a position Pi of a landmark Li in the environmental object on a landmark map and de-distortion point cloud data of the environmental object;

a second acquisition module configured to match the position Pi of the landmark Li on the landmark map with its neighbors on the landmark map to acquire a position Pj of a landmark Lj nearest to the position Pi on the landmark map;

a third acquisition module configured to perform scan matching on a two-dimensional grid map by using the de-distortion point cloud data of the environmental object to acquire a global pose of the robot in the two-dimensional grid map as a global pose observation value $G_{pose}$ of the robot; and an iterative optimization module configured to perform iterative optimization on a pose of the robot based on the position Pi of the landmark Li on the landmark map, the position Pj of the landmark Lj on the landmark map, an estimated pose of the robot and the global pose observation value $G_{pose}$, until an error $E_1$ which is a difference between the positions of the landmark Li and the landmark Lj on the landmark map and an error $E_2$ which is a difference between the estimated pose of the robot and the global pose observation value $G_{pose}$ are minimized are minimized;

wherein the first acquisition module comprises:

a sampling unit configured to sample the environmental object by the two-dimensional laser radar to acquire raw radar point cloud data of the environmental object;

a correction unit configured to remove distortion from the raw radar point cloud data of the environmental object based on a relative pose of each point in the raw radar point cloud data to acquire the de-distortion point cloud data of the environmental object;

a clustering unit configured to cluster the de-distortion point cloud data of the landmark Li in the environmental object to acquire a point cloud cluster of the landmark Li; and a center finding unit configured to derive a geometric center coordinate of the point cloud cluster in a robot body coordinate system, and take the geometric center coordinate of the point cloud cluster in the robot body coordinate system as the position Pi of the landmark Li on the landmark map; and wherein the correction unit comprises:

a new origin determination unit configured to determine a new origin of a laser radar coordinate system in which the two-dimensional laser radar is located after one scan cycle; and a multiplication unit configured to multiply a relative pose $\Box$T with a coordinate P of each point in the raw radar point cloud data in the laser radar coordinate system of an old origin, and take a result of the multiplication $\Box$T*P as a coordinate of each point in the raw radar point cloud data relative to the new origin, the relative pose $\Box$T being robot pose data obtained for each point in the raw radar point cloud data with respect to the new origin.

7. The fusion positioning device of claim 6, wherein the computer program further comprises:

a comparison module configured to compare a laser reflective intensity corresponding to a respective point in the de-distortion point cloud data of the environmental object with a preset light intensity threshold; and a filtering module configured to select point cloud data having the laser reflective intensity higher than the preset light intensity threshold in the de-distortion point cloud data of the environmental object, as de-distortion point cloud data of the landmark Li in the environmental object.

8. The fusion positioning device of claim 6, wherein the third acquisition module comprises:

a search unit configured to determine several candidate poses in a pose search space from the pose of the robot at a previous time of a current time;

a matching unit configured to project the de-distortion point cloud data of the environmental object onto the two-dimensional grid map by using each candidate pose of the several candidate poses, and calculate a matching score of the each candidate pose on the two-dimensional grid map; and a global pose determination unit configured to determine a candidate pose having the highest matching score on the two-dimensional grid map among the several candidate poses as the global pose of the robot in the two-dimensional grid map.

9. The fusion positioning device of claim 6, wherein the iterative optimization module comprises:

a construction unit configured to construct a nonlinear least square problem using the pose of the robot as a state; and a first correction unit configured to take the error $E_1$ as an error constraint condition of the nonlinear least square problem, and iteratively optimize the pose of the robot until the error $E_1$ and the error $E_2$ are minimized.

10. The fusion positioning device of claim 6, wherein the iterative optimization module comprises:

a model construction unit configured to construct a particle filter model or an extended Kalman filter model based on the position Pi of the landmark Li on the landmark map, the position Pj of the landmark Lj on the landmark map, the estimated pose of the robot and the global pose observation value $G_{pose}$, and a second correction unit configured to continuously correct the estimated pose of the robot using the particle filter model or the extended Kalman filter model until the error $E_1$ and the error $E_2$ are minimized.

11. An apparatus comprising a memory, a processor, and a computer program stored on the memory and runnable on the processor, wherein the computer program when executed by the processor causes the processor to implement steps of the method of claim 1.

12. The apparatus of claim 11, after the removing distortion from the raw radar point cloud data of the environmental object to acquire the de-distortion point cloud data of the environmental object, the processor further executing:

comparing a laser reflective intensity corresponding to a respective point in the de-distortion point cloud data of the environmental object with a preset light intensity threshold; and selecting point cloud data having the laser reflective intensity higher than the preset light intensity threshold in the de-distortion point cloud data of the environmental object, as de-distortion point cloud data of the landmark Li in the environmental object.

13. The apparatus of claim 11, wherein the performing scan matching on the two-dimensional grid map by using the de-distortion point cloud data of the environmental object to acquire the global pose of the robot in the two-dimensional grid map as a global pose observation value Gpose of the robot comprises:

determining several candidate poses in a pose search space from the pose of the robot at a previous time of a current time;

projecting, by using each candidate pose of the several candidate poses, the de-distortion point cloud data of the environmental object onto the two-dimensional grid map, and calculating a matching score of the each candidate pose on the two-dimensional grid map; and determining a candidate pose having the highest matching score on the two-dimensional grid map among the several candidate poses as the global pose of the robot in the two-dimensional grid map.

14. The apparatus of claim 11, wherein the performing iterative optimization, based on the position Pi of the landmark Li on the landmark map, the position Pj of the landmark Lj on the landmark map, the estimated pose of the robot and the global pose observation value Gpose, on the pose of the robot until the error E1 and the error E2 are minimized comprises:

constructing a nonlinear least square problem using the pose of the robot as a state; and taking the error E1 as an error constraint condition of the nonlinear least square problem, and iteratively optimizing the pose of the robot until the error E1 and the error E2 are minimized.

15. The apparatus of claim 11, wherein the performing iterative optimization, based on the position Pi of the landmark Li on the landmark map, the position Pj of the landmark Lj on the landmark map, the estimated pose of the robot and the global pose observation value Gpose, on the pose of the robot until the error E1 and the error E2 are minimized comprises:

constructing a particle filter model or an extended Kalman filter model based on the position Pi of the landmark Li on the landmark map, the position Pj of the landmark Lj on the landmark map, the estimated pose of the robot and the global pose observation value Gpose; and continuously correcting the estimated pose of the robot using the particle filter model or the extended Kalman filter model until the error E1 and the error E2 are minimized.

16. A non-volatile computer-readable storage medium, the computer-readable storage medium storing a computer program, wherein the computer program when executed by a processor causes the processor to implement steps of the method of claim 1.

* * * * *